US006604215B1

(12) United States Patent
Chiba

(10) Patent No.: US 6,604,215 B1
(45) Date of Patent: Aug. 5, 2003

(54) DIGITAL BROADCAST RECEIVER AND METHOD FOR CONTROLLING RECEPTION THEREBY

(75) Inventor: Yoshiyuki Chiba, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/286,757

(22) Filed: Apr. 6, 1999

(30) Foreign Application Priority Data

Apr. 9, 1998 (JP) .......................................... P10-097207

(51) Int. Cl.[7] .................................................. H04L 1/18
(52) U.S. Cl. ........................................ 714/751; 714/774
(58) Field of Search ................................ 714/774, 704, 714/752, 812, 751; 369/13.02; 375/340, 224

(56) References Cited

U.S. PATENT DOCUMENTS 5,416,774 A  *  5/1995  Shigematsu et al. ........ 714/774

FOREIGN PATENT DOCUMENTS

EP         0772317 A2  *  10/1996  .................. 714/774

* cited by examiner

Primary Examiner—Albert Decady
Assistant Examiner—Mujtaba Chaudry
(74) Attorney, Agent, or Firm—Lerner, David, Littenberg, Krumholz & Mentlik, LLP

(57) ABSTRACT

In a digital broadcast receiver, stable operation can be achieved even if the C/N ratio is at a low level. The C/N ratio rises in an unlocked state and when the bit error rate drops to $10^{-2}$ for example, a lock/unlock signal changes from unlock to lock. When the C/N ratio further rises and the bit error rate comes down to $10^{-10}$, for example, section data in received signals are acquired. Then, a channel is selected by using the section data, and video data and audio data are received.

19 Claims, 5 Drawing Sheets

F I G. 3A 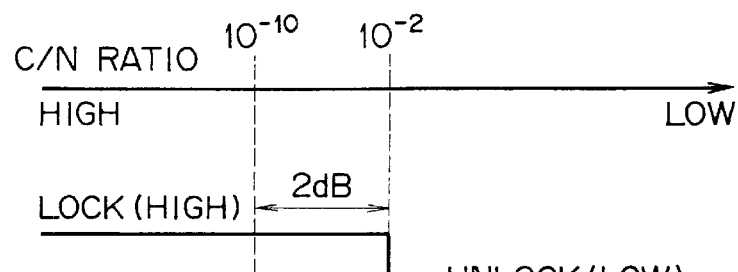
F I G. 3B 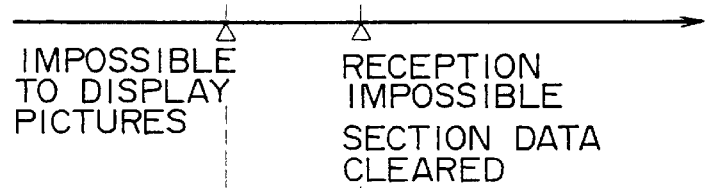
F I G. 3C 
F I G. 3D 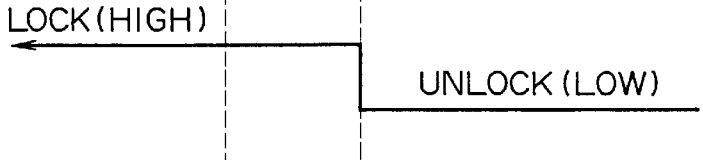
F I G. 3E 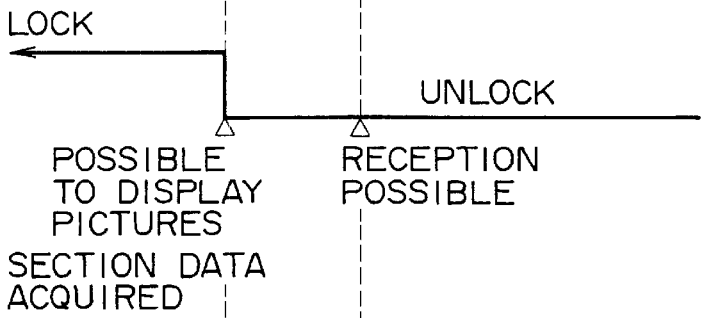
F I G. 3F 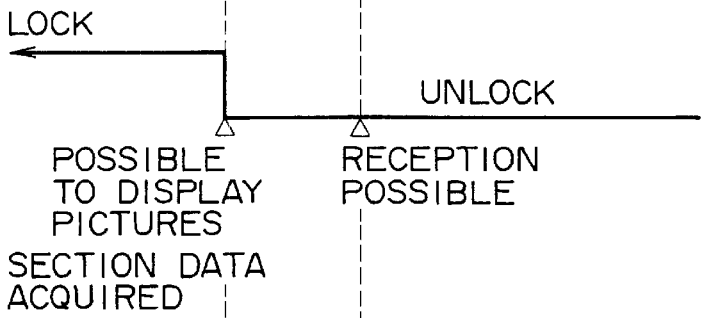
F I G. 3G 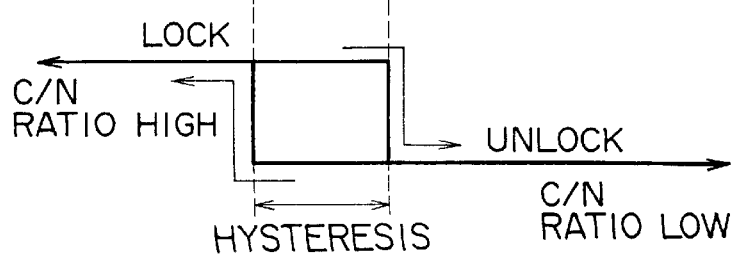

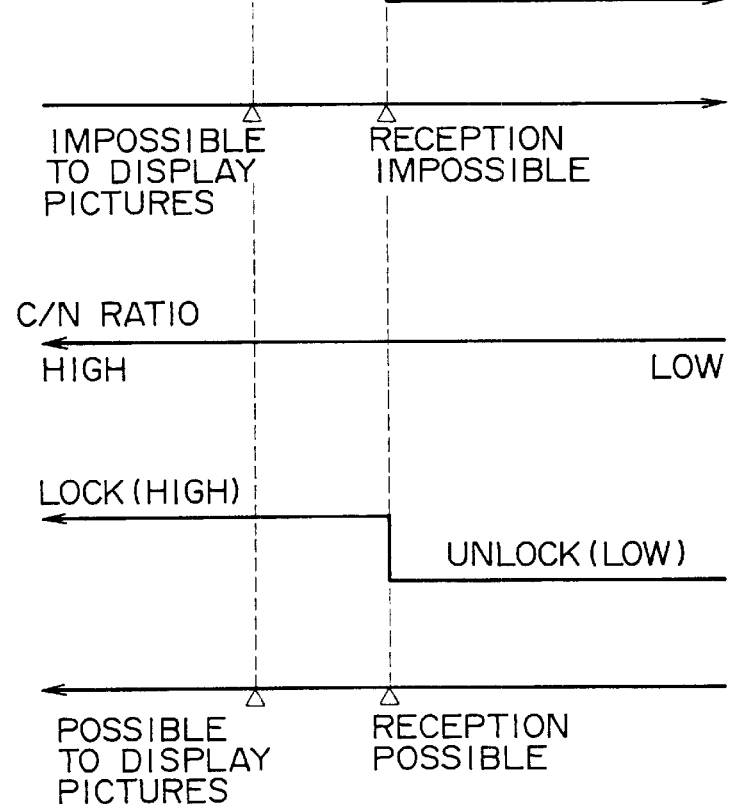

DIGITAL BROADCAST RECEIVER AND METHOD FOR CONTROLLING RECEPTION THEREBY

FIELD OF THE INVENTION

The present invention relates to a digital broadcast receiver, suitable for use in digital satellite broadcasting, and a method for controlling reception thereby, and more particularly to a technique making possible stable reception even where the carrier to noise (C/N) ratio of received signal is low.

BACKGROUND OF THE INVENTION

Digital satellite broadcasting is coming into expanding use. Compared with analog broadcasting, digital satellite broadcasting, which uses the Moving Picture Experts Group Phase 2 (MPEG 2) system or the like for data compression, is more resistant to noise and fading, and capable of transmitting signals of higher quality. It can also facilitate multichannel communication and cost reduction per channel. Furthermore, it is capable of providing not only video and sound signals but also such other services as data transmission.

Generally, in receiving a television broadcast, when the C/N ratio drops, received images are disturbed, and picture quality deteriorates. As shown in FIG. 4, while picture quality gradually deteriorates in analog broadcasting as the C/N ratio drops, it is sharply degraded in digital broadcasting when the C/N ratio drops to a certain level.

The reason why picture quality is degraded by a drop in C/N ratio in such a manner in digital broadcasting is that error correction is processed in digital satellite broadcasting. That is, in digital satellite broadcasting, as shown in FIG. 5, when the C/N ratio drops, the bit error rate (BER) rises. Unless the BER rises to a certain level, error correction is possible on the part of the receiver.

In multichannel digital satellite broadcasting referred to above, section data are multiplexed and transmitted together with video data and audio data, which are program data. Section data include data necessary for conditional accessing and the electronic program guide (EPG) as well as data called program specific information (PSI), which are required for channel selection. The transmission rate for each type of data is, for example, 6 Mbps for video data, 256 Kbps for audio data or 10 Kbps for section data. In a digital satellite broadcast receiver, when receiving a multichannel digital satellite broadcast, a demultiplexer first detects section data and the detected section data are temporarily stored in a buffer memory connected to the demultiplexer. In the section data stored in such manner, the PSI data necessary for channel selection are read by a microcomputer. The PSI data include table data such as a network information table (NIT), a program association table (PAT) and a program map table (PMT). Particulars of transmission (such as the plane of polarization, carrier frequency and convolution rate) for each carrier are stated in the NIT. The PAT lists information on channels in the carrier and the packet ID (PID) of the PMT that represents the contents of each channel. The PID of the transport packet of video and audio data that constitute each channel is stated in the PMT. Accordingly, by referring to the PSI, it is possible to identify the carrier used for transmission on the channel selected by the user and the PID the transport packet of the video and audio data on the channel has. By referring to the PSI, the microcomputer identifies the carrier that is to be received, and controls the tuner accordingly. Further, by referring to the PSI, the microcomputer also identifies the PID of needed video and audio data, and controls the demultiplexer to extract the transport packet having this PID. The transport packet thereby extracted is decoded by an MPEG decoder, and video signals and audio signals are obtained.

In the multichannel digital satellite broadcast receiver described above, since the probability of error occurrence is one per 10,000 bits when BER is $10^{-4}$ for example, 600 errors per second in video data, 25 to 26 errors per second in audio data and one error per second in section data are likely to occur. Accordingly, even if the reception of video and audio data is impossible (error correction cannot be performed), the reception of section data may be possible to some extent (the error correction can be performed).

In a conventional digital satellite broadcast receiver, the operation of a receiver is controlled by using a one bit lock/unlock signal, which is the output of a quadrature phase shift keying (QPSK) demodulator. This lock/unlock signal is a signal that indicates the possibility or impossibility of QPSK demodulation; when the QPSK demodulation is possible, a locked mode is selected, and when the QPSK demodulation is impossible, an unlocked mode is selected.

FIGS. 6A to 6F show the operation of a conventional digital satellite broadcast receiver at a low C/N ratio. As shown in FIGS. 6A to 6C, when the C/N ratio drops and the BER rises to $10^{-10}$ for example, error correction cannot be performed by a forward error correction (FEC) decoder, and pictures consisting of video data cannot be displayed. When the C/N ratio further drops and the BER rises to $10^{-2}$ for example, reception becomes impossible because the QPSK demodulator becomes unable to perform demodulation. Then, the lock/unlock signal changes from lock to unlock. Thus, when the C/N ratio is going down, transition to the unlocked mode takes place some time after it becomes impossible to display pictures (after the C/N ratio has dropped by 2 decibels for example). When the lock/unlock signal changes to unlock, the receiver clears the section data that have been stored in the buffer memory, connected to the demultiplexer, and have been used.

As shown in FIGS. 6D to 6F, when the C/N ratio rises in the unlocked state and the BER drops to $10^{-2}$ for example, the QPSK demodulator resumes the ability to perform demodulation, and the lock/unlock signal shifts from unlock to lock. As the section data are receivable then, they are acquired. Moreover, when the C/N ratio is further enhanced and the BER drops to $10^{-10}$ for example, error correction can be performed by the FEC decoder, and it becomes possible to display pictures consisting of video data. Accordingly, a channel is selected by using the section data, which have been detected when the mode shifted from unlock to lock, and video and audio data are outputted. Thus, when the C/N ratio is going up, the section data become receivable, and after a while (after the C/N ratio has risen to 2 decibels for example), it becomes possible to display pictures.

In the conventional digital satellite broadcast receiver described above, as the C/N ratio is liable to fluctuate particularly in the rain, alternate mode shifts from unlock to lock and vice versa may happen. This fluctuating state would disturb and destabilize the operation of the digital satellite broadcast receiver. Furthermore, section data are acquired in an unstable state of the C/N ratio. Accordingly, correct section data might not be obtained, possibly inviting reception disturbance.

SUMMARY OF THE INVENTION

The present invention is attempted in view of these problems, and it is an object of the present invention to provide a digital broadcast receiver and a method for controlling reception thereby, both capable of ensuring stable operation even when the C/N ratio is low.

According to the present invention, since the configuration is to give the receiving operation of a digital broadcast receiver a hysteretic characteristic against changes in the C/N ratio, stable reception can be achieved even if the C/N ratio is at a low level.

A digital broadcast receiver according to the invention receives digital broadcast signals in which section data are multiplexed with multichannel program data, and is provided with a controlling means for effecting control to give its receiving operation a hysteretic characteristic against changes in the C/N ratio.

By a method for controlling reception by a digital broadcast receiver according to the invention, reception having a hysteretic characteristic against changes in the C/N ratio is performed when the digital broadcast receiver receives digital broadcast signals in which section data are multiplexed with multichannel program data.

According to the present invention, a digital broadcast receiver, from a state in which reception is impossible, starts reception after the C/N ratio rises to a level where reception is possible and further reaches or surpasses a prescribed level.

BRIEF DESCRIPTION OF THE DRAWINGS

FIGS. 3A to 3G constitute a diagram showing the sequence of receiving actions when the C/N ratio changes in the IRD in FIG. 1.

FIGS. 6A to 6F constitute a diagram showing the sequence of receiving actions when the C/N ratio changes in a conventional IRD.

DETAILED DESCRIPTION OF THE PREFERRED EMBODIMENT

Hereafter, a preferred embodiment of the present invention will be described in detail with reference to drawings.

Figure 1:
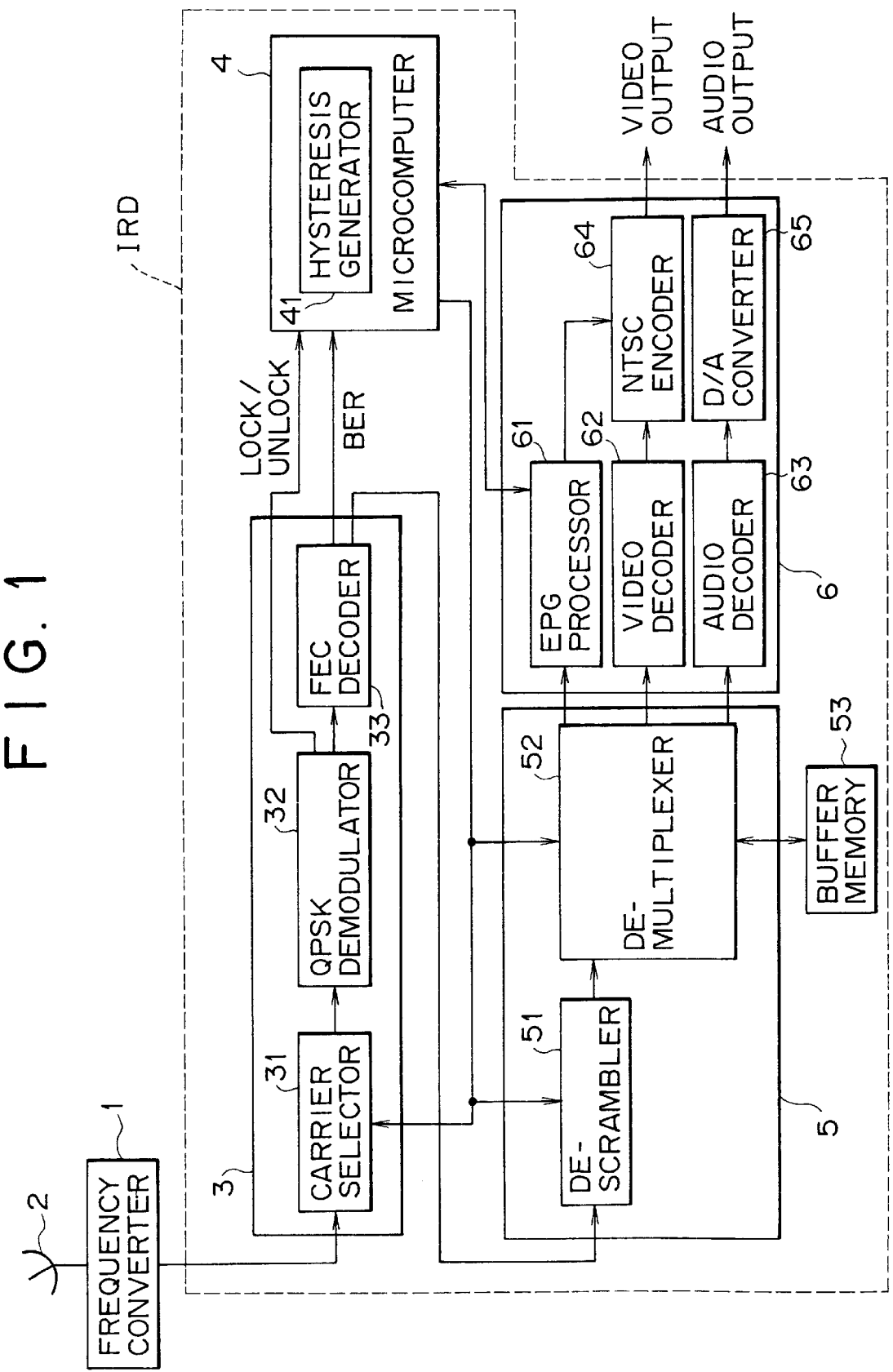
FIG. 1 is a block diagram showing the configuration of an integrated receiver decoder (IRD) to which the present invention is applied.

FIG. 1 is a block diagram showing the configuration of a digital broadcast receiver or an IRD to which the invention is applied. As shown in this FIG. 1, the IRD is provided with a front end section 3, a microcomputer 4, a transport section 5 and an MPEG decoding section 6. Received signals, received by an antenna 2 and converted into a prescribed intermediate frequency by a frequency converter 1, are inputted to the front end section 3.

In accordance with an address signal from the microcomputer 4 corresponding to the user's channel selection, a carrier selector 31 selects a carrier having a prescribed frequency among a plurality of carriers, and delivers it to a QPSK demodulator 32. The QPSK demodulator 32 performs QPSK demodulation on signals supplied from the carrier selector 31, and delivers them to an FEC decoder 33. It also generates a lock/unlock signal, and delivers it to the microcomputer 4. The FEC decoder 33 subjects signal supplied the QPSK demodulator 32 to FEC processing to generate a transport stream, and delivers it to the transport section 5. It also generates BER data, and delivers them to the microcomputer 4.

The microcomputer 4 controls the operation of the whole IRD. It also gives a hysteretic characteristic to the operation of the receiver with a hysteresis generator 41 provided within the microcomputer 4. This hysteresis generator 41 is composed of software. Details of the hysteretic characteristic will be described later.

A descrambler 51 in the transport section 5 descrambles the transport stream supplied from the FEC decoder 33, and delivers it to a demultiplexer 52. The demultiplexer 52 separates a plurality of sets of MPEG video data, MPEG audio data and electronic program guide (EPG) data, which are multiplexed in the transport stream, and delivers them to a video decoder 62, an audio decoder 63 and an EPG process processor 61 in the MPEG decoding section 6, respectively.

The EPG processor 61 in the MPEG decoding section 6 generates video data for on-screen displaying (OSD) of an EPG screen or the like from EPG data in compliance with a command from the microcomputer 4, and delivers them to an NTSC encoder 64. The video decoder 62 decodes the inputted MPEG data, and delivers the decoded data to the NTSC encoder 64. The NTSC encoder 64 converts the video data to be inputted to NTSC video signals, and outputs them to an external monitor (not shown). The audio decoder 63 decodes the MPEG audio data to be inputted, and delivers them to a D/A converter 65. The D/A converter 65 converts the audio data to be inputted into analog audio signals, and outputs them to an external loudspeaker (not shown).

Next, the operation of the above-explained IRD will be described.

The received signals received by the receiving antenna 2 and converted into an intermediate frequency by the frequency converter 1 are inputted to the carrier selector 31 in the front end section 3. In the carrier selector 31, on the basis of a setting signal from the microcomputer 4, signals of a prescribed receive frequency are selected from among the received signals. The selected signals are further subjected to QPSK demodulation processing by the QPSK demodulator 32, followed by FEC processing by the FEC decoder 33, and an MPEG transport stream is outputted to the transport section 5.

In the transport section 5, the descrambler 51 descrambles the MPEG transport stream, and the descrambled MPEG transport stream is sent to the demultiplexer 52. The demultiplexer 52 extracts section data, and stores them into a buffer memory 53. In the demultiplexer 52, MPEG video and audio data of a desired TV program are further extracted from the MPEG transport stream in accordance with a program selection command by the viewer, and sent to the video decoder 62 and the audio decoder 63 in the MPEG decoding section 6. Incidentally, the program selection command by the viewer is executed on an EPG display screen in which the EPG processor 61 turns the EPG data, separated by the demultiplexer 52, into video data, and video signals resulting from the conversion of the video data into NTSC signals by the NTSC encoder 64 are displayed as the EPG frame on an external monitor.

The MPEG data sent to the video decoder 62 are decoded here, and then outputted to the outside after being converted into NTSC video signals by the NTSC encoder 64. The MPEG audio data sent to the audio decoder 63 are also decoded here, and then outputted to the outside after being converted into analog audio signals in the D/A converter 65.

Figure 2:
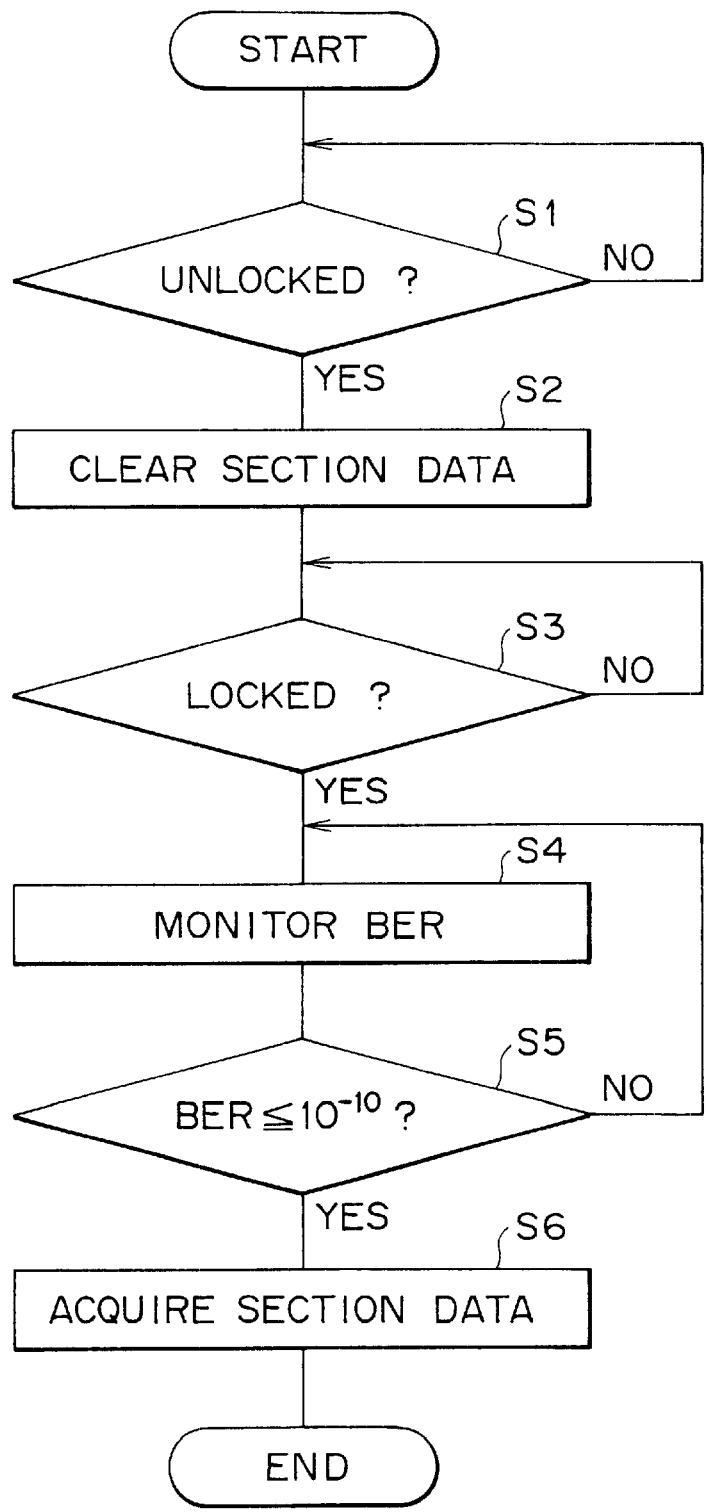
FIG. 2 is a flowchart showing the sequence of processing by a microcomputer in the IRD in FIG. 1.
Figure 4:
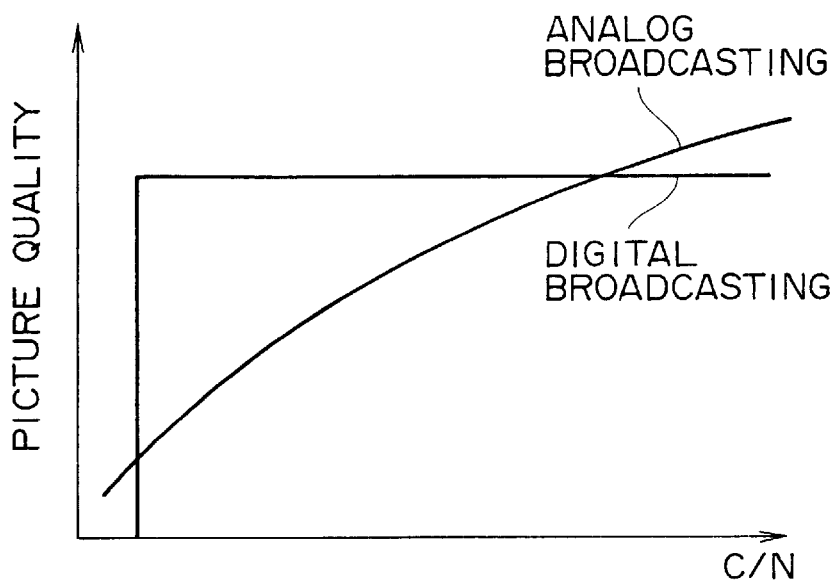
FIG. 4 is a diagram showing the dependence of picture quality on the C/N ratio in analog broadcasting and digital broadcasting.
Figure 5:
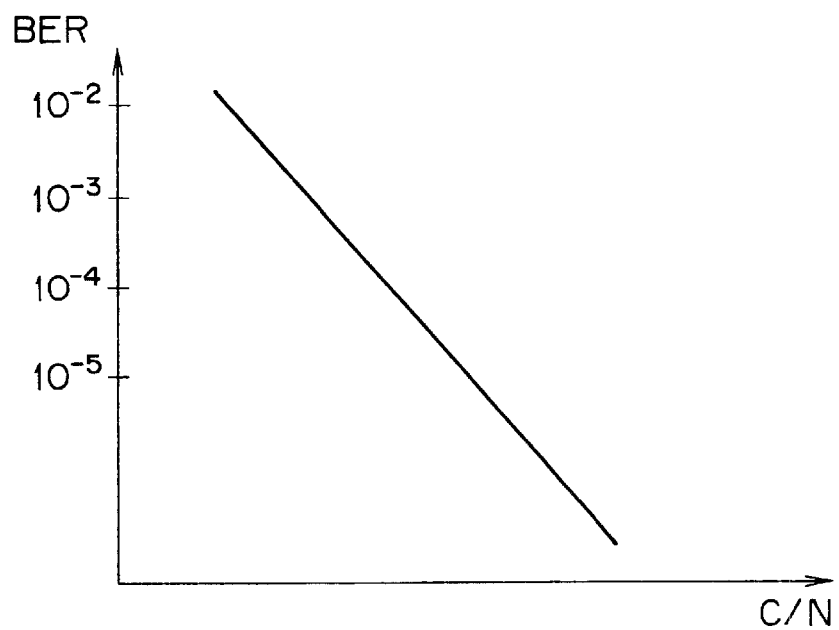
FIG. 5 is a diagram showing the dependence of the BER on the C/N ratio in digital broadcasting.

Next, with reference to FIGS. 2 and 3A to 3G, the operation that takes place when the C/N ratio has changed will be described. FIG. 2 is a flowchart showing the sequence of processing by the microcomputer 4, and FIGS. 3A to 3G show operations corresponding to different steps of the processing.

The microcomputer 4 decides whether a lock/unlock signal supplied from the QPSK demodulator 32 is for unlocking or not (Step S1). Then, if it decides the signal is for unlocking (YES at Step S1), the section data stored in the buffer memory 53 and used so far are eliminated (Step S2).

To describe the operations up to this point with reference to FIGS. 3A to 3G, when the C/N ratio drops to $10^{-10}$ for example as shown in FIGS. 3A to 3C, error correction becomes impossible in the FEC decoder 33, and pictures consisting of video data can no longer be displayed. If the C/N ratio further drops and the BER rises to $10^{-2}$ for example, since the QPSK demodulator 32 becomes unable to perform demodulation, reception becomes impossible, and the lock/unlock signal changes from lock to unlock. When in this state, the choice at Step 2 in FIG. 2 is YES. Thus, when the C/N ratio is going down, some time after it becomes no longer possible to display pictures (after the C/N ratio drops to 2 decibels for example), the signal changes to unlock. Further, when the lock/unlock signal is for unlocking, the output of the NTSC encoder 64 and the D/A converter 65 are muted.

Then, the microcomputer 4 decides whether the lock/unlock signal supplied from the QPSK demodulator 32 is for locking or not (Step S3), and if it decides the signal is for locking (YES at Step S3), it monitors the BER data output from the FEC decoder 33 (Step S4). Then, if it decides the BER is not more than $10^{-10}$ (YES in Step S5) for example, it acquires section data (Step S6).

To describe the operations up to this point with reference to FIGS. 3D to 3G, when the C/N ratio is enhanced in the unlocked state and the BER comes down to $10^{-2}$ for example, it becomes possible for the QPSK modulator to perform demodulation, and the lock/unlock signal changes from unlock to lock (FIGS. 3D and 3E). However, acquisition of section data has not yet been done. Then, when the C/N ratio is further enhanced to $10^{-10}$ for example, section data are acquired. In this state, the FEC decoder 33 is enabled to perform error correction, and it becomes possible for pictures consisting of video data to be displayed. Thus, in the rising of the C/N ratio, some time after reception becomes possible (after the C/N ratio rises to 2 decibels for example), section data are acquired and used for channel selection, and video data and audio data are outputted. In other words, in substance, unlocking is cancelled after reception becomes receivable and the C/N ratio rises (FIG. 3F).

FIGS. 3B and 3F can be combined to give FIG. 3G. It is known that the operation to switch from locking and unlocking of the IRD and vice versa, as shown in this diagram, is given a hysteretic characteristic. The hysteretic characteristic is generated by the hysteresis generator 41 in the microcomputer 4. The preferable amount of the hysteresis is 2 to 3 decibels.

Incidentally, although the transmission path is via a satellite in the preferred embodiment described above, the present invention can also be applied to digital broadcasting using a ground wave, optical cable, coaxial cable or the like as the transmission path.

What is claimed is:

1. A digital broadcast receiver for receiving digital broadcast signals in which control data are multiplexed with a plurality of sets of program data, comprising:

means for receiving the digital broadcast signals and outputting a status signal indicating whether the signals are receivable or unreceivable and a bit error rate signal obtained by arithmetic operation, and control means for controlling the receiver so that, when the bit error rate signal has risen in level to a first value, the status signal that is outputted changes from indicating a state of possibility of reception to indicating a state of impossibility of reception; when the bit error rate signal has dropped in level to the first value, the status signal that is outputted changes from indicating a state of impossibility of reception to indicating a state of possibility of reception; and when the bit error rate signal has further dropped in level to a second value less than the first value, the control data are acquired.

2. A digital broadcast receiver as claimed in claim 1, wherein the control data are used for channel selection to choose a desired program.

3. A digital broadcast receiver as claimed in claim 1, wherein, when the status signal has changed from indicating a state of possibility of reception to indicating a state of impossibility of reception, control data that have already been acquired are cleared.

4. A digital broadcast receiver as claimed in claim 1, wherein the bit error rate signal rises in level with a drop in a carrier-to-noise (C/N) ratio of the received digital broadcast signals.

5. A digital broadcast receiver as claimed in claim 4, wherein the difference between the first and second values is set to a value corresponding to 2 to 3 decibels of the C/N ratio.

6. A method for controlling a digital broadcast receiver for receiving digital broadcast signals in which control data are multiplexed with a plurality of sets of program data, comprising the steps of:

receiving the digital broadcast signals and outputting a status signal indicating whether the signals are receivable or unreceivable and a bit error rate signal obtained by arithmetic operation, and controlling the receiver so that, when the bit error rate signal has risen in level to a first value, the status signal that is outputted changes from indicating a state of possibility of reception to indicating a state of impossibility of reception; when the bit error rate signal has dropped in level to the first value, the status signal that is outputted changes from indicating a state of impossibility of reception to indicating a state of possibility of reception; and when the bit error rate signal has further dropped in level to a second value less than the first value, the control data are acquired.

7. A method for controlling a digital broadcast receiver as claimed in claim 6, wherein the control data are used for channel selection to choose a desired program.

8. A method for controlling a digital broadcast receiver as claimed in claim 7, wherein, when the status signal has changed from indicating a state of possibility of reception to indicating a state of impossibility of reception, control data that have already been acquired are cleared.

9. A method for controlling a digital broadcast receiver as claimed in claim 6, wherein the difference between the first and second values is set to a value corresponding to 2 to 3 decibels of a carrier-to-noise (C/N) ratio of the received digital broadcast signals.

10. A method for controlling a digital broadcast receiver as claimed in claim 9, wherein the bit error rate signal rises in level with a drop in the C/N ratio.

11. A digital broadcast receiver for receiving digital broadcast signals in which control data are multiplexed with a plurality of sets of program data, comprising:

a front end section for providing a status signal and a bit-error rate (BER) signal, wherein the status signal is representative of at least a first state and a second state, the first state indicating when it is possible to demodulate the received digital broadcast signals and the second state indicating when it is not possible to demodulate the received digital broadcast signals, and wherein the BER signal is associated with the received digital broadcast signals, and wherein a transition between the first state and the second state is associated with a first BER value; and a processor responsive to the status signal and the BER signal for controlling recovery of the control data such that when the status signal changes from the second state to the first state recovery is only performed when the BER signal indicates a BER value lower than a second BER value that is lower than the first BER value.

12. A digital broadcast receiver as claimed in claim 11, wherein the control data are used for channel selection to choose a desired program.

13. A digital broadcast receiver as claimed in claim 11, wherein, when the status signal has changed from the first state to the second state, control data that have already been acquired are cleared.

14. A digital broadcast receiver as claimed in claim 11, wherein the bit error rate signal rises in level with a drop in a carrier-to-noise (C/N) ratio of the received digital broadcast signals.

15. A method for use in a digital broadcast receiver for receiving digital broadcast signals in which control data are multiplexed with a plurality of sets of program data, the method comprising the steps of:

providing a status signal and a bit-error rate (BER) signal, wherein the status signal is representative of at least a first state and a second state, the first state indicating when it is possible to demodulate the received digital broadcast signals and the second state indicating when it is not possible to demodulate the received digital broadcast signals, and wherein the BER signal is associated with the received digital broadcast signals, and wherein a transition between the first state and the second state is associated with a first BER value; and controlling recovery of the control data such that when the status signal changes from the second state to the first state recovery is only performed when the BER signal indicates a BER value lower than a second BER value that is lower than the first BER value.

16. A method for controlling a digital broadcast receiver as claimed in claim 15, wherein the control data are used for channel selection to choose a desired program.

17. A method for controlling a digital broadcast receiver as claimed in claim 15, wherein, when the status signal has changed from indicating a state of possibility of reception to indicating a state of impossibility of reception, already acquired control data are cleared.

18. A method for controlling a digital broadcast receiver, as claimed in claim 15, wherein the bit error rate signal rises in level with a drop in a carrier-to-noise (C/N) ratio of the received digital broadcast signals.

19. A digital broadcast receiver for receiving digital broadcast signals in which control data are multiplexed with a plurality of sets of program data, the digital broadcast receiver comprising:

a memory for storing the control data; and a processor for controlling recovery of the control data from the received digital broadcast signals for storage in the memory such that the control data is stored in the memory in accordance with a hysteresis loop associated with a bit-error rate (BER) of the received digital broadcast signals, wherein if the BER is higher than a first BER value, recovery does not occur until the BER is lower than a second BER value, the second BER value being lower than the first BER value, and wherein if the BER is lower than the second BER value, recovery is enabled until the BER is higher than the first BER value.

* * * * *